(12) United States Patent
Kada et al.

(10) Patent No.: US 12,483,094 B2
(45) Date of Patent: Nov. 25, 2025

(54) BRUSHLESS ELECTRIC MOTOR WITH A MEMBRANE FOR REGULATING INTERNAL PRESSURE

(71) Applicant: Valeo Systemes Thermiques, Le Mesnil-Saint-Denis (FR)

(72) Inventors: Kamal Kada, Le Mesnil-Saint-Denis (FR); David Bonneau, Le Mesnil-Saint-Denis (FR)

( * ) Notice: Subject to any disclaimer, the term of this patent is extended or adjusted under 35 U.S.C. 154(b) by 227 days.

(21) Appl. No.: 18/266,697

(22) PCT Filed: Oct. 6, 2021

(86) PCT No.: PCT/EP2021/077606
§ 371 (c)(1),
(2) Date: Jun. 12, 2023

(87) PCT Pub. No.: WO2022/122215
PCT Pub. Date: Jun. 16, 2022

(65) Prior Publication Data
US 2024/0048026 A1    Feb. 8, 2024

(30) Foreign Application Priority Data
Dec. 11, 2020   (FR) ........................... 2013035

(51) Int. Cl.
*H02K 7/14*    (2006.01)
*H02K 9/22*    (2006.01)
*H02K 11/33*   (2016.01)

(52) U.S. Cl.
CPC ............. *H02K 7/14* (2013.01); *H02K 9/227* (2021.01); *H02K 11/33* (2016.01)

(58) Field of Classification Search
None
See application file for complete search history.

(56) References Cited

U.S. PATENT DOCUMENTS 10,320,262 B2 *   6/2019   Griffen ............. H02K 11/0094
2008/0193275 A1 * 8/2008   De Filippis ............. H02K 1/30
                                                          310/43

(Continued)

FOREIGN PATENT DOCUMENTS

JP          4625522 B2      2/2011

OTHER PUBLICATIONS

International Search Report and Written Opinion in corresponding International Application No. PCT/EP2021/077606, dated Nov. 29, 2021 (12 pages).

*Primary Examiner* — Bernard Rojas
(74) *Attorney, Agent, or Firm* — Osha Bergman Watanabe & Burton LLP

(57) ABSTRACT

The present invention provides a brushless electric motor for rotating a rotor of a motor-driven fan of a vehicle, comprising at least two electromagnetic elements, at least one of the electromagnetic elements being equipped with at least two coils, and a housing defining an internal volume in which are housed a control circuit and a power circuit, the power circuit being configured to electrically connect an electrical power supply of the vehicle to the coils. The power circuit comprises at least one tube configured to put the internal volume of the housing into aeraulic communication with an external environment of the housing, the tube passing through a wall of the housing, the power circuit comprising at least one breathable membrane arranged to close the tube, the breathable membrane being impermeable to liquid water and permeable to at least one gas.

14 Claims, 3 Drawing Sheets

(56) References Cited

U.S. PATENT DOCUMENTS

2014/0339939 A1  11/2014  Illingworth et al.
2017/0170701 A1   6/2017  Haensch et al.

* cited by examiner

[fig 1]
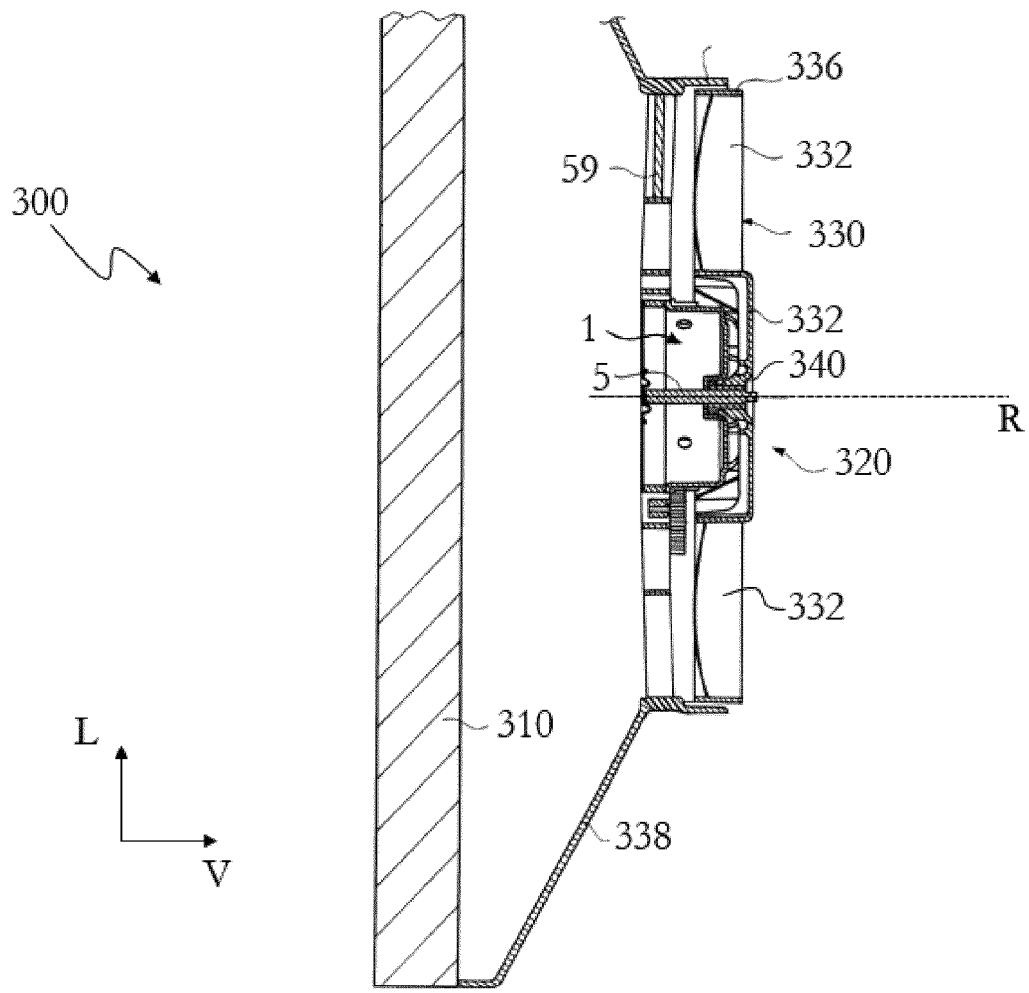

[fig 2]
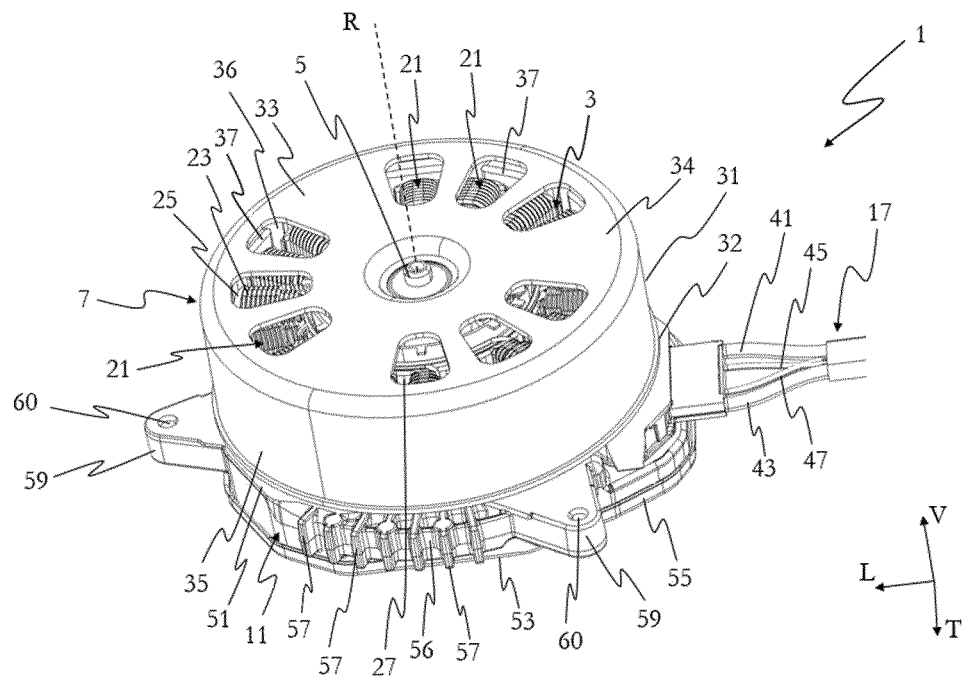
[fig 3]
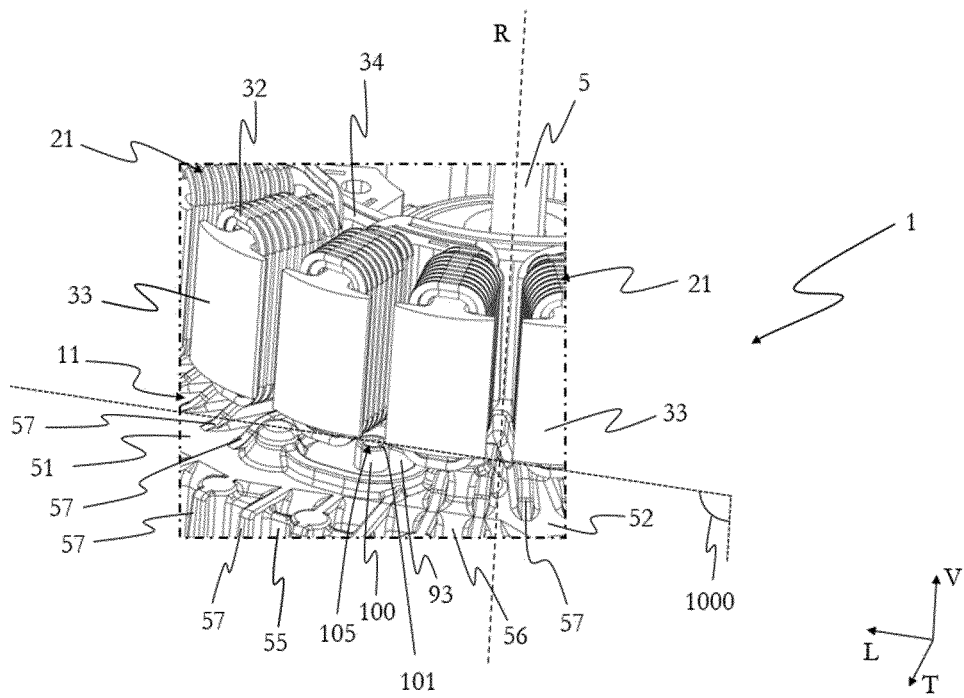

[fig 4]
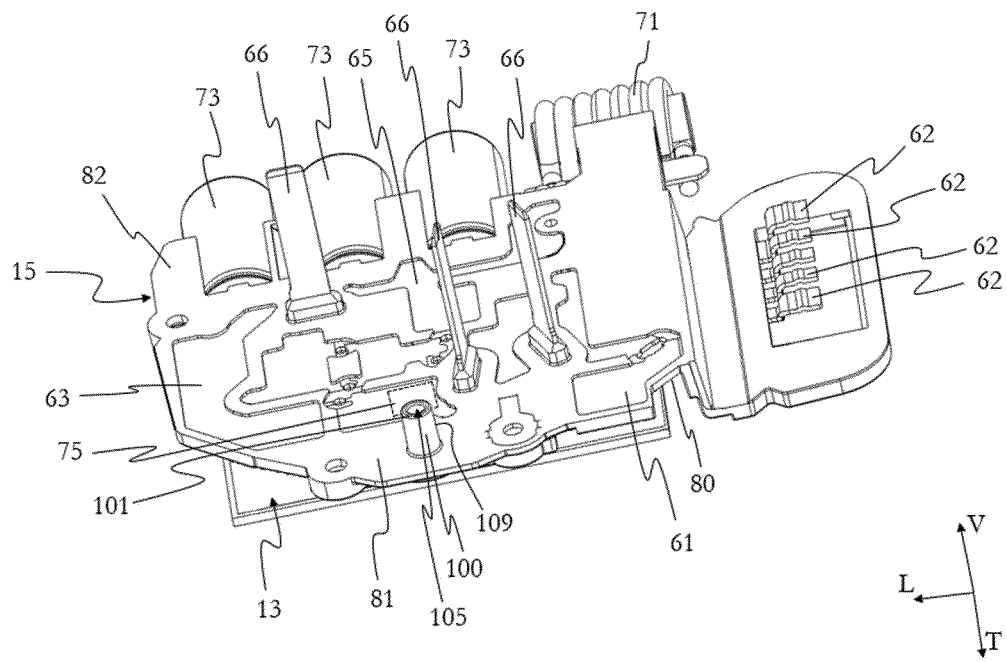
[fig 5]
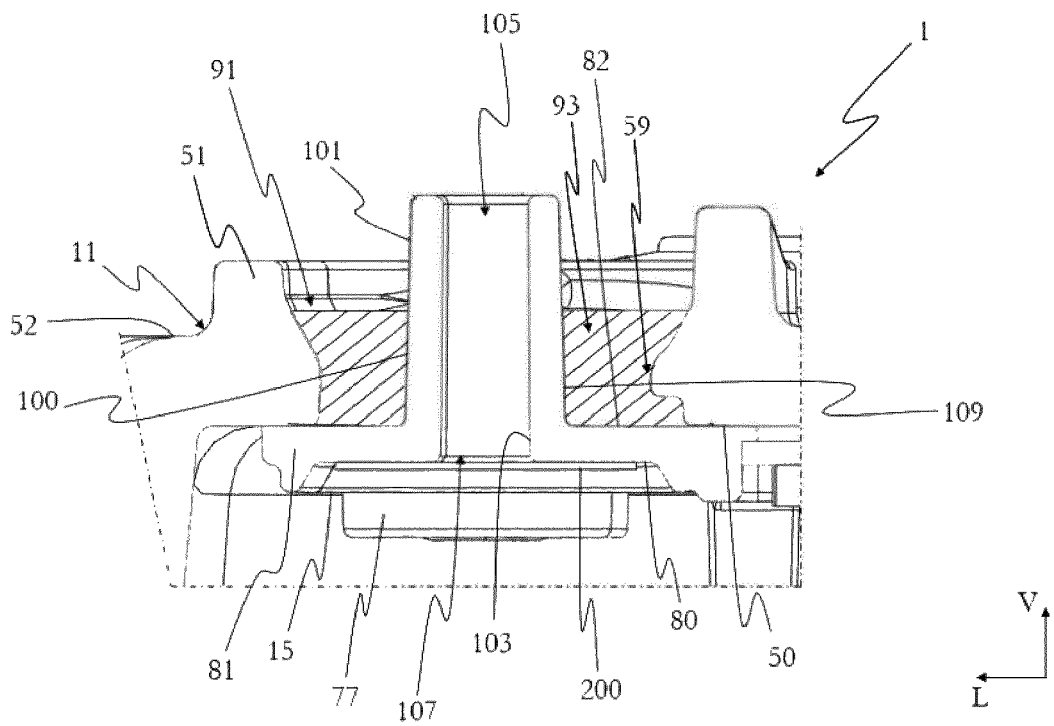

BRUSHLESS ELECTRIC MOTOR WITH A MEMBRANE FOR REGULATING INTERNAL PRESSURE

The present invention relates to the field of vehicle heat treatment modules. More particularly, the invention relates to brushless electric motors and to heat treatment module motor-fan units equipped with brushless electric motors.

A brushless electric motor for a motor-fan unit generally comprises a rotor and a stator surmounting an electronic box. This electronic box houses electronic circuits making it possible to electrically supply the stator and/or the rotor from an electrical power supply of the vehicle, in which the motor-fan unit is used. These electronic circuits also make it possible to control the operating parameters of the brushless electric motor.

Since the electronic circuits are sensitive to the presence of water as well as to dust, the boxes must be closed in a sealed manner. Thus, a seal is placed between the two shells to ensure the tightness of the electronic box once manufactured.

A through hole is provided in the wall of the box so that the internal pressure of the box is balanced with the pressure of the external environment of the box. In addition, during operation, the brushless electric motor heats the air. When stopped, the motor cools down and the electronic boards are cold, which causes the water contained in the air to condense on the cold electronic circuits in the electronic box. This through hole is sealed using a GoreTex®-type membrane. Thus, water vapor can escape from the housing of the box and liquid water cannot enter inside the electronic box, just like dust.

A disadvantage of such a solution is that the membrane can be damaged during the life of the product, in particular when the vehicle is cleaned with a pressure washer. The pressure of the liquid water risks tearing the membrane, which has the consequence of allowing the liquid water to penetrate inside the electronic box and cause a breakdown which risks immobilizing the vehicle.

In addition, fixing the membrane to the box represents an additional difficulty. Indeed, this fixing of the membrane may require the use of additional parts. This makes the development and manufacture of the electronic box more complicated.

The object of the present invention is to respond at least in part to the above problems and also to lead to other advantages by proposing a new type of brushless electric motor.

The present invention proposes a brushless electric motor intended to rotate a propeller of a motor-fan unit, in particular of a heat exchanger of a heat treatment module, of a vehicle. The brushless electric motor comprises at least two electromagnetic elements, at least one of the electromagnetic elements being equipped with at least two coils, a box delimiting an interior volume in which are housed a servo circuit and a power circuit, the power circuit being configured to electrically connect an electrical power supply of the vehicle to the coils, the electrical connection between the electrical power supply of the vehicle and the coils being placed under the control of the servo circuit. The power circuit comprises at least one tube configured to place the interior volume of the box in aeraulic communication with an external environment of the box, the tube passing through a wall of the box, the power circuit comprising at least one breathable membrane arranged to close the tube, the breathable membrane being impermeable to liquid water and permeable to at least one gas, in particular air.

The interior volume of the box contains the servo circuit and the control circuit. The tube of the control circuit passes through the upper wall and allows communication between the interior volume and an external environment of the box. The breathable membrane closing the tube allows the exchange of gas between the interior volume of the box and the external environment of the box and blocks the entry into the interior volume of liquids coming from the environment. Therefore, the pressure inside the box can balance with the pressure of the external environment. In addition, the water vapor trapped in the box can escape through the tube, thus avoiding the formation of liquid water on the power circuit and/or the servo circuit when the motor cools down after use and/or when the climatic conditions change.

According to one embodiment, the power circuit comprises a support carrying at least one electrically conductive track and at least one electronic component, the tube being arranged on the support.

According to one embodiment, the electrically conductive track has a cross section greater than or equal to 4 mm$^2$ as seen in projection in a plane perpendicular to a main direction of conduction of the current.

According to one embodiment, the electrically conductive track has the shape of a bar with a rectangular or substantially rectangular cross section.

According to one embodiment, the electronic component is an inverter. The inverter makes it possible to generate an alternating current from a direct current present on the vehicle. Such an inverter can be formed by a single electronic component but it can also be the assembly of a plurality of electronic components carried by the support of the power circuit.

According to one embodiment, the tube is integral with the support. Here, and throughout the following text, the term "integral" should be understood as meaning that the elements that are integral form a single part and are therefore made of the same material or materials. This part can be obtained for example by molding or by injection molding. These integral parts are thus inseparable without destroying one and/or the other of these parts.

According to one embodiment, the support comprises at least one synthetic material. The breathable membrane is then more easily fixed to the support.

According to one embodiment, the polymer is chosen from the group comprising a PPS, a PPT and a mixture thereof, regardless of the percentage of glass fiber added.

According to one embodiment, at least a portion of the tube projects from the box.

According to one embodiment, at least a portion of the tube extends in the direction of at least one of the electromagnetic elements of the brushless electric motor arranged outside the box. One of the electromagnetic elements at least partly protects the inlet of the tube from projections of elements which could damage the membrane.

According to one embodiment, the at least one of the electromagnetic elements is a stator or a rotor.

According to one embodiment, the tube comprises at least one inner end arranged in the interior volume of the box and one outer end arranged in the external environment of the box, the membrane being arranged at any one of these ends.

According to one embodiment, the membrane is arranged at the inner end. The membrane is even better protected from external attack.

According to one embodiment, the membrane is welded and/or adhesively bonded to a contour of the inner end.

According to one embodiment, the tube passes through the wall of the box by passing through a hole in the wall, a cavity extending from the tube to the edge of the hole in the wall through which the tube passes, the cavity comprising a sealing element. The tightness of the box is not broken by any space between a contour of the hole and a wall of the tube.

According to one embodiment, the cavity is filled, preferably entirely, with the sealing element.

According to one embodiment, the sealing element comprises at least one polymer.

According to one embodiment, the polymer is chosen from the group comprising a polysiloxane, a polyurethane, and a mixture thereof.

According to one embodiment, the sealing element has a Young's modulus less than or equal to 3 GPa. The polymer is then sufficiently flexible to deform during thermal expansion or thermal contraction of the box and/or of the tube, for example due to environmental conditions.

According to one embodiment, the box is a heat sink configured to dissipate heat generated by the servo circuit and/or the power circuit into the external environment of the box.

According to one embodiment, the box comprises a material chosen from aluminum, copper, a heat-conducting polymer and a mixture thereof. The box also acts as protection against electromagnetic fields.

According to one embodiment, the invention further provides a motor-fan unit of a heat treatment module, in particular of at least one heat exchanger, of a vehicle, comprising a propeller and at least one brushless electric motor according to the invention, the electric motor being connected to the propeller by a shaft and being configured to drive the propeller in rotation.

According to the invention, the invention also relates to a heat treatment module of a vehicle, comprising at least one heat exchanger and at least one brushless electric motor according to the invention or at least one motor-fan unit according to the invention.

Further features and advantages of the invention will become more clearly apparent both from the following description and from a number of exemplary embodiments, which are given by way of nonlimiting indication with reference to the attached schematic drawings, in which:

FIG. 1 is a schematic sectional view of a heat treatment module comprising a motor-fan unit according to the invention.

FIG. 2 is a schematic perspective view of a brushless electric motor according to the invention in the assembled configuration as shown in FIG. 1.

FIG. 3 is a schematic perspective view of a box of the brushless electric motor of FIG. 2 without rotor, the box being passed through by a tube according to the invention.

FIG. 4 is a schematic perspective view of a power circuit comprising the tube of FIG. 3.

FIG. 5 is a sectional view in a longitudinal and vertical plane at the level of the tube passing through the box of FIG. 3.

It should first of all be noted that, although the figures set out the invention in a detailed manner for the implementation thereof, they may of course be used to better define the invention, where appropriate. It should also be noted that, in all of the figures, elements that are similar and/or perform the same function are indicated using the same numbering.

In the following description, a direction of a longitudinal axis L, a direction of a transverse axis T, and a direction of a vertical axis V are represented by a trihedron (L, T, V) in the figures. A horizontal plane is defined as being a plane perpendicular to the vertical axis V, a longitudinal plane is defined as being a plane perpendicular to the transverse axis T, and a transverse plane is defined as being a plane perpendicular to the longitudinal axis L.

With reference to FIG. 1, the heat treatment module 300 shown in FIG. 1 comprises a heat exchanger 310 which forms part of the cooling circuit of a combustion engine and a motor-fan unit 320 to ensure a forced circulation of an air flow F through the heat exchanger 310.

The heat exchanger 310 comprises, in a conventional manner, a bundle of tubes through which a cooling fluid passes, such as an aqueous solution of ethylene glycol. It is crossed by the air flow F perpendicular to the bundle of tubes. The engine of the vehicle is cooled by a heat exchange between the flow of air passing through the bundle and the fluid in the cooling circuit.

The motor-fan unit 320 is placed facing the bundle of the radiator. The motor-fan unit 320 comprises a propeller 330 driven in rotation by a brushless electric motor 1. The brushless electric motor 1 is fixed on a fairing 338 connected to the periphery of the heat exchanger 310.

The propeller 330 consists of a plurality of blades 332 mounted on a bowl 334 and surrounded by a circular fairing 336 itself housed inside the fairing 338. The bowl 334 of the propeller 330 is secured to a shaft 5 of the brushless electric motor 1 on which it is fixed by means of a central nut 340. The brushless electric motor 1 is connected to the fairing 338 by fixing lugs 59.

With reference to FIG. 1 and to FIG. 2, the brushless electric motor 1 comprises a stator 3 and a rotor 7 provided with a shaft 5 and rotatably mounted about an axis of rotation R. The axis of rotation R is parallel to the vertical axis V as defined above. The axis of rotation is for example parallel to a longitudinal axis of the vehicle when the heat module is mounted on the vehicle.

In the embodiment illustrated in FIG. 2, the stator 3 extends in a general extension plane parallel to the previously defined horizontal plane. The shaft 5 extends along an extension axis perpendicular to the general extension plane of the stator 3. In other words, the shaft 5 extends along the vertical axis V from the main extension plane of the stator 3 to the rotor 7.

The stator 3 comprises a plurality of coils 21, for example produced by winding one or more metal wires 23 around teeth 25 of a body 27 of the stator 3. The coils 21 are uniformly arranged in a circle around the shaft 5 as seen in projection in the horizontal plane. The stator 3 is fixed relative to the box 31. The rotor 7 is free to rotate relative to the stator 3. The coils 21 make it possible to generate a rotating magnetic field when they are supplied by an electric current from an electrical power supply of the vehicle.

The rotor 7 is mounted fixed on the shaft 5. The axis of rotation R of the rotor 7 coincides with the extension axis of the shaft 5. The rotor 7 comprises a bell 31 of cylindrical shape with a circular base, a longitudinal axis of which substantially coincides with the axis of rotation R. The bell 31 forms a Faraday cage around the stator 3. The bell 31 is open at a first longitudinal end 32 and closed by an upper partition 34 at a second longitudinal end 33. The bell 31 is delimited radially by a peripheral partition 35. A housing 36 is delimited by the peripheral partition 35 and the upper partition 34. The housing 36 accommodates at least part of the stator 3, that is to say, in the example shown in FIG. 2, the coils 21. In other words, the peripheral partition 35 of the rotor 7 surrounds the coils 21 of the stator 3.

As shown in FIG. 1, the rotor 7 comprises a plurality of permanent magnets 37. The permanent magnets 37 are arranged in the housing 36. The permanent magnets 37 are uniformly distributed on an internal face of the peripheral partition 35 as seen in projection in the horizontal plane. The permanent magnets 37 are magnetic poles which tend to follow the rotating magnetic field generated by the coils 21 of the stator 3 and then allow the rotor 7 to rotate.

With reference to FIG. 2, to FIG. 3 and to FIG. 4, the brushless electric motor 1 also comprises a box 11 delimiting an interior volume in which are housed a servo circuit 13 and a power circuit 15. The box 11 is closed and sealed.

The power circuit 15 is configured to electrically connect an electrical conduction device 17 to the coils 21 from an electrical power supply (not shown) of the vehicle. The electrical connection between the power circuit 15 and the coils 21 is placed under the control of the servo circuit 13. The power circuit 15 comprises a tube 100 configured to place the interior volume of the box 11 in aeraulic communication with an external environment of the box 11. Thus, the pressure inside the box 11 can be balanced with the pressure of the external environment. The tube 100 will be described in more detail below.

The electrical power supply of the vehicle is routed to the power circuit 13 by the electrical conduction device 17. The electrical conduction device 17 comprises a bundle of electric cables comprising at least two power cables 41, 43 configured to convey the electric current from the electrical power supply of the vehicle to the power circuit, and two servo cables 45, 47 to connect the servo circuit, otherwise known as the control circuit, to the vehicle. The two servo cables 45, 47 have the function of transmitting signals from the vehicle to the brushless electric motor 1 and/or from the brushless electric motor 1 to the vehicle. The transmitted signals may for example concern the setting in operation (on/off) of the brushless electric motor 1 and/or an operating setpoint of the brushless electric motor 1 and/or a diagnosis of the state of the brushless electric motor 1.

It should be understood here, as well as in all that follows, that "electric cable" means one or more flexible electrically conductive element(s) surrounded by at least one electrically insulating layer.

With reference to FIG. 2, the box 11 comprises an upper wall 51 and a lower wall 53 interconnected by a vertical wall 55. The upper wall 51, the lower wall 53 and the vertical wall 55 delimit the interior volume. The upper wall 51 and the lower wall 53 extend parallel to the horizontal plane as previously defined. The vertical wall 55 extends circumferentially from an edge of the upper wall 41 toward an edge of the lower wall 53, parallel to the vertical axis V.

The box 11 is composed of at least one heat-conducting material which allows it to be a heat sink. This makes it possible in particular to dissipate the heat produced by the stator 3, the rotor 7, the power circuit 15 and/or the servo circuit 13 when the brushless electric motor 1 is in operation. The heat-conducting material is chosen from aluminum, copper, a heat-conducting polymer and a mixture thereof.

With reference to FIG. 2 and to FIG. 3, the box 11 comprises fins 57. A first part of the fins projects from an outer face 52 of the upper wall 51 and a second part of the fins 57 projects from an outer face 56 of the vertical wall 55. The fins make it possible to improve heat exchange between the box 11 and the air outside the box 11. The fins of the first part of the fins 57 are integral with the upper wall 51 of the box 11. The fins of the second part of the fins 57 are integral with the vertical wall 55 of the box 11. The fins 57 have a blade shape as seen in projection in a plane comprising the axis of rotation R.

The material or materials making up the box 11 are also sufficiently electrically conductive to absorb at least in part the electromagnetic fields emitted by the power circuit 15 and/or the servo circuit 13. The electronic components of the vehicle are thus protected from the electromagnetic fields generated by the power circuit 15 and/or the servo circuit 13.

With reference to FIG. 2, the box comprises fixing lugs 59 for fixing the motor-fan unit 320 to the heat treatment module 300. Each fixing lug 59 extends from the outer face 56 of the vertical wall 55 of the box 11 in a general extension plane perpendicular to the axis of rotation R. Each fixing lug 59 comprises a through passage 60 which extends along an axis parallel to the axis of rotation R. The through passages 60 are configured to cooperate with fixing elements (not shown) of the heat treatment module 300. The fixing elements are for example screws.

With reference to FIG. 4, the power circuit 15 comprises a plurality of electrically conductive tracks 61, 63, 65. Each electrically conductive track 61, 63, 65 has the shape of a bar with a rectangular cross section as seen in projection in a plane perpendicular to a main direction of conduction of the current. Each electrically conductive track 61, 63, has a cross section greater than or equal to 4 $mm^2$ as seen in projection in a plane orthogonal to the main direction of conduction of the current.

A first set of the plurality of electrically conductive tracks has an electrical connection end 62a for connection to the power cables 41, 43 of the electrical conduction device 17. In other words, each electrically conductive track of the first set comprises an electrical connection end 62a for connection to one of the power cables 41, 43 of the electrical conduction device 17. Each electrical connection end 62a of the electrically conductive tracks of the first set is for example welded to one end of one of the cables 41, 43.

The servo circuit 13 comprises electrical connectors 62b with the servo cables 45, 47 of the electrical conduction device 17. Otherwise, the electrical connectors 62b connect the servo cables 45, 47 to the servo circuit. Each electrical connector 62b is for example welded to one end of one of the cables 45, 47. The electrical connectors 62b are molded with the power circuit 15.

A second set of the plurality of electrically conductive tracks has an electrical connection end 66 for connection to electrical connectors (not shown) of the stator 3. In other words, each electrically conductive track of the second set comprises an electrical connection end 66 for connection to a connector of the stator 3. Each electrical connection end 66 of the electrically conductive tracks of the second set is for example welded to one of the connectors of the stator 3.

With reference to FIG. 4, the power circuit 15 comprises a plurality of electronic components 71, 73, 75. The plurality of electronic components comprises at least one coil 71, at least one capacitor 73, and at least one inverter 75. The inverter 75, shown in dotted lines, is arranged on a lower face 80 of the power circuit 15. The inverter 75 is configured to convert the direct current supplied by the electrical power supply of the vehicle into an alternating electric current so as to generate a rotating magnetic field in the stator 3 and therefore to rotate the rotor 7. The inverter 75 comprises at least one transistor, preferably an insulated gate field effect transistor also called MOSFET, acronym for Metal Oxide Semiconductor Field Effect Transistor.

The power circuit 15 comprises a support 81 for the electrically conductive tracks 61, 63, 65. The support 81 is a molding on at least part of the electrically conductive tracks 61, 63, 65. The support 81 extends in a general extension plane perpendicular to the axis of rotation R.

The support 81 is composed of at least one synthetic material. The synthetic material may be a dielectric material so as to avoid short circuits. The synthetic material is chosen from the group comprising a PPS, a PPT and a mixture thereof, regardless of the percentage of glass fiber added.

The servo circuit 13 is fixed to a lower face of the support 81 of the power circuit 15. The power circuit 15 is fixed to the box 11 on an inner face 50 of the upper wall 51 of the box 11. Thus, an upper face 82 of the support 81 of the power circuit 15 faces the inner face 50 of the upper wall 51. In other words, the power circuit 15 is inserted between the servo circuit 13 and the upper wall 51 of the box 11, along the axis of rotation R.

With reference to FIG. 3, FIG. 4 and FIG. 5, FIG. 5 being a sectional view of the box 11 along the section plane 1000 in FIG. 3, the tube 100 has the shape of a right cylinder with a circular base, as seen in projection in a plane perpendicular to the axis of rotation R. The tube 100 extends from the interior volume of the box 11 toward an external environment of the box 11, along the vertical axis V.

The tube 100 passes through the upper wall 51 of the box 11 at a hole 59 passing through the upper wall 51 of the box 11. Thus, an outer end 101 of the tube 100 projects from the outer face 52 of the upper wall 51 of the box 11, while an inner end 103 of the tube 100 is in the interior volume of the box 100. The outer end 101 of the tube 100 is provided with a first orifice 105. The inner end 103 of the tube 100 is provided with a second orifice 107. The first orifice 105 opens opposite the stator 3. In other words, in the assembled configuration, the stator 3 rests on the outer face 52 of the upper wall 51 of the box 11. A part of the stator 3 then faces the first orifice 105 of the tube 100 so that certain foreign bodies cannot penetrate directly into the tube without hitting the stator 3 beforehand. The stator 3 thus protects an entry into the tube 100. In an embodiment that has not been shown, the first orifice 105 opens opposite the rotor 7.

The tube 100 comprises a radial wall 109 which extends between the contour of the first orifice 105 and the contour of the second orifice 107. The tube 100 is arranged on the support 81 of the power circuit 15. In the embodiment shown in FIG. 4 and in FIG. 5, the tube 100 is integral with the support 81 of the power circuit 15. In other words, the tube 100 is not attached to the support 81. The tube 100 and the support 81 are for example molded together so as to form a single molded part. Thus, the tube 100 and the support 81 can be separated only by destroying the tube 100 and/or the support 81.

With reference to FIG. 5, a cavity 91 extends from the radial wall 109 of tube 100 to the edge of hole 59 through which tube 100 passes. The cavity 91 is delimited by the upper face 82 of the support 81 and by the axial wall 109 of the tube 100. The cavity 91 widens from the upper face 82 of the support 81 to its opening in the outer face 52 of the upper wall 51.

In order to ensure the continuity of the sealing of the box 11 at the hole 59, the cavity 91 comprises a sealing element 93. In the embodiment illustrated in FIG. 3 and in FIG. 5, the cavity 91 is filled with the sealing element 93.

The sealing element 93 comprises at least one polymer. The polymer is a polysiloxane having a Young's modulus equal to 3 GPa. The sealing element has sufficient flexibility to adapt to the thermal expansion generated by the operation of the brushless electric motor 1 without the risk of breaking the seal. In an embodiment that has not been shown, the polymer may be a polyurethane whose Young's modulus is less than or equal to 3 GPa.

With reference to FIG. 5, the power circuit 13 comprises a breathable membrane 200 arranged so as to close the tube 100. The breathable membrane 200 is impermeable to at least one liquid and permeable to at least one gas. In the illustrated embodiment, the breathable membrane is impermeable to liquid water and permeable to air. The breathable membrane 200 is permeable to water in its gaseous form. The breathable membrane 200 is for example a GoreTex® membrane.

The breathable membrane 200 has the shape of a disk as seen in projection in a plane perpendicular to the axis of rotation R. The breathable membrane 200 is arranged at the inner end 103 of the tube 100 so as to cover the second orifice 107. More specifically, the breathable membrane 200 is fixed to the lower face 80 of the support 81 so as to cover the second orifice 107. The breathable membrane 200 has a diameter greater than a diameter of the contour of the second orifice 107. The breathable membrane 200 is fixed to the support 81 of the power circuit 13 by adhesive bonding at the contour of the second orifice 107.

Of course, the invention is not limited to the examples that have just been described, and numerous modifications may be made to these examples without departing from the scope of the invention.

The invention claimed is:

1. A brushless electric motor configured to rotate a propeller of a motor-fan unit of a vehicle, comprising:
    at least two electromagnetic elements, at least one of the electromagnetic elements being equipped with at least two coils;
    a box delimiting an interior volume in which are housed a servo circuit; and
    a power circuit, the power circuit being configured to electrically connect an electrical power supply of the vehicle to the coils, the electrical connection between the electrical power supply of the vehicle and the coils being placed under the control of the servo circuit,
    wherein the power circuit comprises;
        at least one tube configured to place the interior volume of the box in aeraulic communication with an external environment of the box, the tube passing through a wall of the box, the power circuit comprising at least one breathable membrane arranged to close the tube, the breathable membrane being impermeable to liquid water and permeable to at least one gas, and
        a support carrying at least one electrically conductive track and at least one electronic component, the tube being arranged on the support.

2. The brushless electric motor as claimed in claim 1, in which the electrically conductive track has a cross section greater than or equal to 4 mm$^2$ as seen in projection in a plane orthogonal to a main direction of conduction of the current.

3. The brushless electric motor as claimed in claim 2, in which the electrically conductive track is a bar with a rectangular cross section.

4. The brushless electric motor as claimed in claim 2, in which the electronic component is an inverter.

5. The brushless electric motor as claimed in claim 2, in which the tube is integral with the support.

6. The brushless electric motor as claimed in claim 2, in which the support comprises at least one synthetic material.

7. The brushless electric motor as claimed in claim 1, in which at least a portion of the tube projects from the box.

8. The brushless electric motor as claimed in claim 1, in which the tube comprises at least one inner end arranged in the interior volume of the box and one outer end arranged in the external environment of the box, the breathable membrane being arranged at any one of these ends.

9. The brushless electric motor as claimed in claim 8, in which the breathable membrane is arranged at the inner end.

10. The brushless electric motor as claimed in claim 1, in which the tube passes through the wall of the box by passing through a hole in the wall, a cavity extending from the tube to the edge of the hole in the wall through which the tube passes, the cavity comprising a sealing element.

11. The brushless electric motor as claimed in claim 1, in which the box is a heat sink configured to dissipate heat generated by the servo circuit and/or the power circuit into the external environment of the box.

12. A motor-fan unit of a heat treatment module of at least one vehicle, comprising:
    a propeller; and
    at least one brushless electric motor as claimed in claim 1, the brushless electric motor being connected to the propeller by a shaft and being configured to drive the propeller in rotation.

13. A brushless electric motor configured to rotate a propeller of a motor-fan unit of a vehicle, comprising:
    at least two electromagnetic elements, at least one of the electromagnetic elements being equipped with at least two coils;
    a box delimiting an interior volume in which are housed a servo circuit; and
    a power circuit, the power circuit being configured to electrically connect an electrical power supply of the vehicle to the coils, the electrical connection between the electrical power supply of the vehicle and the coils being placed under the control of the servo circuit,
    wherein the power circuit comprises at least one tube configured to place the interior volume of the box in aeraulic communication with an external environment of the box, the tube passing through a wall of the box, the power circuit comprising at least one breathable membrane arranged to close the tube, the breathable membrane being impermeable to liquid water and permeable to at least one gas,
    in which the tube passes through the wall of the box by passing through a hole in the wall, a cavity extending from the tube to the edge of the hole in the wall through which the tube passes, the cavity comprising a sealing element.

14. A brushless electric motor configured to rotate a propeller of a motor-fan unit of a vehicle, comprising:
    at least two electromagnetic elements, at least one of the electromagnetic elements being equipped with at least two coils;
    a box delimiting an interior volume in which are housed a servo circuit; and
    a power circuit, the power circuit being configured to electrically connect an electrical power supply of the vehicle to the coils, the electrical connection between the electrical power supply of the vehicle and the coils being placed under the control of the servo circuit,
    wherein the power circuit comprises at least one tube configured to place the interior volume of the box in aeraulic communication with an external environment of the box, the tube passing through a wall of the box, the power circuit comprising at least one breathable membrane arranged to close the tube, the breathable membrane being impermeable to liquid water and permeable to at least one gas,
    in which the box is a heat sink configured to dissipate heat generated by the servo circuit and/or the power circuit into the external environment of the box.

* * * * *